(12) United States Patent
Watanabe

(10) Patent No.: US 11,345,768 B2
(45) Date of Patent: May 31, 2022

(54) MODIFIED VINYL ALCOHOL-BASED POLYMER AND DISPERSION STABILIZER FOR SUSPENSION POLYMERIZATION

(71) Applicant: DENKA COMPANY LIMITED, Tokyo (JP)

(72) Inventor: Wataru Watanabe, Niigata (JP)

(73) Assignee: DENKA COMPANY LIMITED, Tokyo (JP)

( * ) Notice: Subject to any disclaimer, the term of this patent is extended or adjusted under 35 U.S.C. 154(b) by 88 days.

(21) Appl. No.: 16/759,300

(22) PCT Filed: Feb. 1, 2019

(86) PCT No.: PCT/JP2019/003739
§ 371 (c)(1),
(2) Date: Apr. 24, 2020

(87) PCT Pub. No.: WO2019/156006
PCT Pub. Date: Aug. 15, 2019

(65) Prior Publication Data
US 2021/0179757 A1     Jun. 17, 2021

(30) Foreign Application Priority Data

Feb. 8, 2018 (JP) .............................. JP2018-021366

(51) Int. Cl.
*C08F 216/06* (2006.01)
*C08F 14/06* (2006.01)
*C08F 218/08* (2006.01)

(52) U.S. Cl.
CPC ............ *C08F 216/06* (2013.01); *C08F 14/06* (2013.01); *C08F 218/08* (2013.01)

(58) Field of Classification Search
CPC ....... C08F 216/06; C08F 14/06; C08F 218/08
USPC ...................................................... 526/208
See application file for complete search history.

(56) References Cited

U.S. PATENT DOCUMENTS

| 4,208,499 | A | | 6/1980 | Maruhashi et al. |
| 5,780,547 | A | * | 7/1998 | Saeki ................. C08F 8/12 |
| | | | | 525/61 |
| 6,107,426 | A | | 8/2000 | Shibutani |
| 7,070,731 | B2 | | 7/2006 | Kato et al. |

FOREIGN PATENT DOCUMENTS

| EP | 2876116 A1 * | 5/2015 | ............ C08F 114/06 |
| EP | 3219735 A1 | 9/2017 | |
| JP | 5445686 A | 4/1979 | |
| JP | 59155408 A | 9/1984 | |
| JP | 05105702 A * | 4/1993 | ............. C08F 14/06 |
| JP | 5105702 A | 4/1993 | |
| JP | 111505 A | 1/1999 | |
| JP | 11217413 A | 8/1999 | |
| JP | 2004189888 A | 7/2004 | |
| JP | 2014136796 A | 7/2014 | |
| WO | 2010113568 A1 | 10/2010 | |
| WO | 2010113569 A1 | 10/2010 | |
| WO | WO-2010113569 A1 * | 10/2010 | ................ C08F 2/20 |
| WO | 2013115239 A1 | 8/2013 | |
| WO | WO-2013115239 A1 * | 8/2013 | ................ C08F 2/20 |

OTHER PUBLICATIONS

Extended European Search Report dated Oct. 8, 2020.
Machine Translation of Japanese Office Action dated Oct. 13, 2020.
International Search Report for PCT/JP2019/003739 dated Mar. 26, 2019.
English-language abstract for WO2013115239 (2015).
English-language abstract for WO2010113569 (2012).
English-language abstract for JPH11217413 (1999).
English-language abstract for JP2014136796 (2014).
English-language abstract for JPS59155408 (1984).
English-language abstract for WO2010113568 (2012).

* cited by examiner

*Primary Examiner* — Michael M. Bernshteyn
(74) *Attorney, Agent, or Firm* — Caesar Rivise, PC

(57) ABSTRACT

A modified vinyl alcohol-based polymer including a polyoxyalkylene unit represented by a general formula (I) in a side chain and a carbonyl unit represented by a general formula (II) at a main chain terminal, wherein with respect to a total mole number of monomer units constituting the main chain of the modified vinyl alcohol-based polymer, a ratio of a mole number of monomer units having the polyoxyalkylene unit represented by the general formula (I) in the side chain to is 0.01 mol % to 5 mol %, and a ratio of a mole number of the carbonyl unit represented by the general formula (II) is 0.01 mol % to 0.5 mol %.

9 Claims, No Drawings

MODIFIED VINYL ALCOHOL-BASED POLYMER AND DISPERSION STABILIZER FOR SUSPENSION POLYMERIZATION

CROSS-REFERENCE TO RELATED APPLICATIONS

This application is the U.S. National Phase Application of PCT/JP2019/003739, filed Feb. 1, 2019, which claims priority from JP 2018-021366, filed Feb. 8, 2018, the contents of which applications are incorporated herein by reference in their entireties for all purposes.

FIELD OF THE INVENTION

The present invention relates to a modified vinyl alcohol-based polymer. Further, the present invention relates to a dispersion stabilizer for suspension polymerization, particularly to a dispersion stabilizer suitable for suspension polymerization of a vinyl compound, especially vinyl chloride.

BACKGROUND OF THE INVENTION

In the case of suspension polymerization of a vinyl chloride monomer or a mixture of a vinyl chloride monomer and a monomer copolymerizable therewith, it is essential to use various dispersion stabilizers. As a dispersion stabilizer, polyvinyl alcohol-based, methylol cellulose, vinyl acetate/maleic anhydride copolymer, and gelatin and the like are used. Among these, polyvinyl alcohol (PVA) has excellent properties and is generally most often used. For example, methods of using a modified PVA having a low degree of polymerization, a low degree of saponification, and a specific oxyalkylene group in a side chain have been proposed as a dispersion stabilizer for suspension polymerization of a vinyl compound (see Patent Literatures 1 to 3).

CITATION LIST

Patent Literature

[Patent Literature 1] Japanese Patent Application No. S59-155408
[Patent Literature 1] WO 2010/113568
[Patent Literature 1] WO 2013/115239

SUMMARY OF THE INVENTION

However, it cannot be said that the dispersion stabilizers described in Patent Literature 1 to 3 necessarily provide satisfactory performance with respect to the following required performance, specifically, (1) resin particles have few coarse particles; (2) resin particles have a uniform particle diameter as much as possible to prevent scale adhesion. (3) a resin with high porosity is obtained, resulting in easy removal of monomer components and a resin with high plasticizer absorbency.

Accordingly, an object of the present invention is to provide a dispersion stabilizer for suspension polymerization which satisfies the above-mentioned requirements (1) to (3) in suspension polymerization of a vinyl compound such as vinyl chloride.

The present inventors have conducted intensive studies to solve the above-mentioned problems, and as a result, it has been found effective to use a modified vinyl alcohol-based polymer as a dispersion stabilizer for suspension polymerization of a vinyl compound, wherein the modified vinyl alcohol-based polymer has a predetermined polyoxyalkylene unit (hereinafter referred to as "alkylene-modified group") in a side chain at a modification rate of 0.01 mol % to 5 mol %, and has a carbonyl unit at a main chain terminal at a modification rate of 0.01 mol % to 0.5 mol %.

Therefore, according to one aspect, the present invention is a modified vinyl alcohol-based polymer, comprising a polyoxyalkylene unit represented by a general formula (I) in a side chain and a carbonyl unit represented by a general formula (II) at a main chain terminal, wherein with respect to a total mole number of monomer units constituting the main chain of the modified vinyl alcohol-based polymer, a ratio of a mole number of monomer units having the polyoxyalkylene unit represented by the general formula (I) in the side chain is 0.01 mol % to 5 mol %, and a ratio of a mole number of the carbonyl unit represented by the general formula (II) is 0.01 mol % to 0.5 mol %.

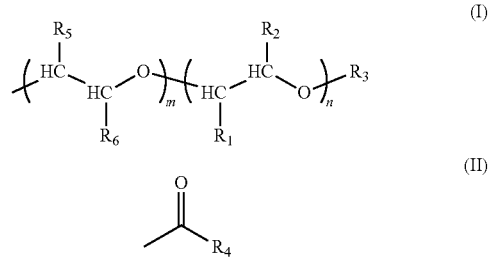

(In the formula, $R_1$ and $R_2$ are each independently a methyl group, an ethyl group or a hydrogen atom, and $R_3$ is a methyl group or a hydrogen atom, n represents a number of repeating units and is an integer of $1 \leq n \leq 70$. $R_4$ represents a hydrogen atom or an alkyl group having 1 to 9 carbon atoms. One of $R_5$ and $R_6$ is a methyl group or an ethyl group, and the other of $R_5$ and $R_6$ is a hydrogen atom, m represents a number of repeating units and is an integer of $1 \leq m \leq 30$.)

In one embodiment of the modified vinyl alcohol-based polymer according to the present invention, an ether bond and/or a carbon-carbon bond is interposed between the polyoxyalkylene unit represented by the general formula (I) and the polyvinyl alcohol chain of the main chain.

In another embodiment according to the present invention, the modified vinyl alcohol-based polymer comprises a monomer unit represented by a general formula (III).

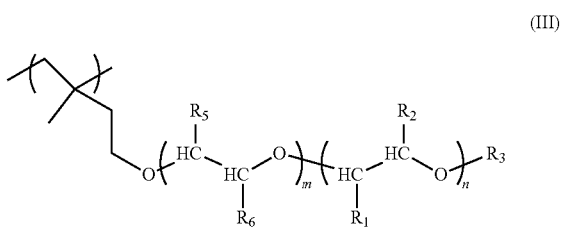

(In the formula, $R_1$, $R_2$, $R_3$, $R_5$, $R_6$, n and m are as defined in the general formula (I).)

In a further embodiment of the modified vinyl alcohol-based polymer according to the present invention, the carbonyl unit comprises a formyl group.

In a further embodiment of the modified vinyl alcohol-based polymer according to the present invention, a viscosity-average polymerization degree is 300 to 5,000, and a saponification degree is 65 mol % to 90 mol %.

According to another aspect, the present invention is a dispersion stabilizer for suspension polymerization, comprising the modified vinyl alcohol-based polymer according to the present invention.

According to a further aspect, the present invention is a method for manufacturing a vinyl-based resin, comprising performing suspension polymerization using the dispersion stabilizer for suspension polymerization according to the present invention for dispersing a vinyl-based compound monomer or a mixture of a vinyl-based compound monomer and a monomer copolymerizable with the vinyl-based compound monomer in water.

According to a further aspect, the present invention is a method for manufacturing the modified vinyl alcohol-based polymer according to the present invention, comprising a step of obtaining a modified vinyl ester-based polymer by copolymerizing a vinyl ester-based monomer with an unsaturated monomer having the polyoxyalkylene unit represented by the general formula (I) in a presence of an aldehyde having the carbonyl unit represented by the general formula (II).

In one embodiment of the method for manufacturing the modified vinyl alcohol-based polymer according to the present invention, the step of obtaining the modified vinyl ester-based polymer is performed while introducing a gas containing oxygen.

When suspension polymerization of a vinyl-based compound is carried out using the dispersion stabilizer for suspension polymerization according to the present invention, resin particles with less formation of coarse particles, and high uniformity in particle diameter can be obtained. Furthermore, due to less formation of coarse particles, blocking during polymerization is suppressed, and particles having high uniformity in particle diameter are obtained, so that scale adhesion is reduced. In addition, since polymer particles having high porosity can be obtained, the polymer particles are excellent in plasticizer absorption and monomer removal. Thus, the dispersion stabilizer for suspension polymerization according to the present invention can have the required performance, which has been difficult for the prior art to achieve.

DETAILED DESCRIPTION OF THE INVENTION

In one embodiment, the dispersion stabilizer for suspension polymerization according to the present invention is a modified vinyl alcohol-based polymer (modified PVA) comprising a polyoxyalkylene unit represented by the following general formula (I) in a side chain and a carbonyl unit represented by the following general formula (II) at a main chain terminal.

General formula (I):

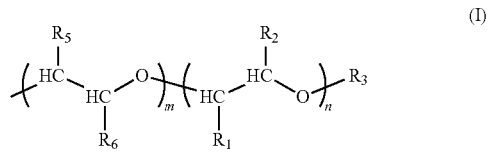

(In the formula, $R_1$ and $R_2$ are each independently a methyl group, an ethyl group or a hydrogen atom, and $R_3$ is a methyl group or a hydrogen atom, n represents the number of repeating units and is an integer of $1 \leq n \leq 70$. One of $R_5$ and $R_6$ is a methyl group or an ethyl group, and the other of $R_5$ and $R_6$ is a hydrogen atom, m represents the number of repeating units and is an integer of $1 \leq m \leq 30$.)

The modified PVA preferably has two or more different units as shown in the general formula (I) in the side chain. Specifically, Examples include those in which the unit having the repeating unit number m is butylene oxide ($R_5$ is a hydrogen atom and $R_6$ is an ethyl group), and the unit having the repeating unit number n is ethylene oxide (both $R_1$ and $R_2$ are hydrogen atoms), and those in which the unit having the repeating unit number m is propylene oxide ($R_5$ is a hydrogen atom and $R_6$ is a methyl group), and the unit having the repeating unit number n is ethylene oxide (both $R_1$ and $R_2$ are hydrogen atoms). Here, the unit having the repeating unit number m and the unit having the repeating unit number n may be in either form of random or block arrangement. However, it is preferable to adopt a block configuration, from the viewpoint that the physical properties based on the alkylene-modified group are more easily exhibited.

n is preferably 10 or more, more preferably 15 or more, and even more preferably 20 or more. Further, n is preferably 70 or less, more preferably 60 or less.

m is preferably 3 or more, more preferably 5 or more. Further, m is preferably 25 or less, more preferably 20 or less.

General formula (II):

($R_4$ represents a hydrogen atom or an alkyl group having 1 to 9 carbon atoms.)

It is important that $R_4$ of the carbonyl unit represented by the general formula (II) in the modified PVA is a hydrogen atom or an alkyl group having 1 to 9 carbon atoms. If the number of carbon in $R_4$ exceeds 9, the amount of unsaturated double bonds generated due to the carbonyl unit will be small, resulting in a modified PVA with poor dispersion performance, and the required physical properties will not be sufficiently exhibited. Therefore, the number of carbon in $R_4$ is preferably 9 or less, more preferably 8 or less, even more preferably 6 or less, and even more preferably 5 or less. $R_4$ may be linear or branched. Specific examples of preferred $R_4$ include methyl, ethyl, n-propyl, isopropyl, n-butyl, isobutyl, s-butyl, t-butyl, n-pentyl, isopentyl, and neopentyl, t-pentyl, hexyl, isohexyl, heptyl, octyl and the like.

In the modified PVA according to the present invention, the structure of the connecting portion between the polyoxyalkylene unit represented by the general formula (I) and the carbon atom constituting the polyvinyl alcohol chain of the main chain is not particularly limited. However, since connecting portions such as esters and amides can be cut during the saponification process of the modified vinyl ester-based polymer, which is described later, it is preferable not to have a structure that is easily hydrolyzed, and specifically, it is preferable that they should be connected via an ether bond and/or a carbon-carbon bond.

Accordingly, in one embodiment, the dispersion stabilizer for suspension polymerization according to the present invention comprises a modified vinyl alcohol-based polymer (modified PVA) having a monomer unit represented by the general formula (III).

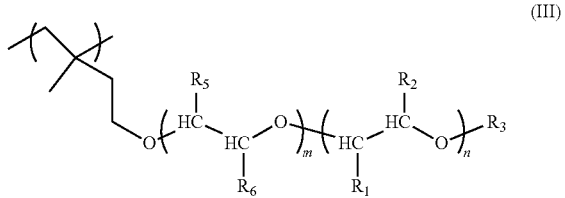

(In the general formula (III), $R_1$, $R_2$, $R_3$, $R_5$, $R_6$, m and n are as defined in the above-described general formula (I).)

Though depending on the type of the alkylene-modified group represented by the general formula (I), it is important that the above-described modified PVA has the alkylene modification rate of 0.01 mol % or more and 5 mol % or less. When the alkylene modification rate exceeds 5 mol %, the ratio of the hydrophobic group contained in one molecule of the modified PVA increases, and the water solubility of the modified PVA decreases, so that it is difficult to use the modified PVA as a dispersion stabilizer for suspension polymerization. Therefore, it is important that the alkylene modification rate is 5 mol % or less, preferably 4 mol % or less, and more preferably 2 mol % or less. On the other hand, when the alkylene modification rate is less than 0.01 mol %, although the water solubility is excellent, the number of modifying groups contained in the modified PVA is small, and the required physical properties are not sufficiently exhibited. Therefore, it is important that the alkylene modification rate is 0.01 mol % or more, preferably 0.05 mol % or more, and more preferably 0.1 mol % or more.

The alkylene modification rate is defined as a ratio (mol %) of a mole number of monomer units having the polyoxyalkylene unit represented by the general formula (I) in the side chain with respect to a total mole number of monomer units constituting the main chain of the modified PVA. The alkylene modification rate can be determined by proton NMR. Specifically, after the modified PVA is saponified to a saponification degree of 99.95 mol % or more, it is sufficiently washed with methanol to prepare a modified PVA for analysis. The prepared modified PVA for analysis is dissolved in deuterium oxide, and a few drops of a deuterium oxide solution of NaOH are added to adjust the pH to 14, and the measurement is performed at 80° C. using proton NMR.

When calculated from oxyethylene units (for example, $R_1$=H, $R_2$=H), the contents are calculated from the integrated value of the peak at 1.2 to 1.8 ppm attributed to the methylene group in the main chain of the modified PVA and the integrated value of the peak at 3.6 to 3.7 ppm attributed to the oxyethylene unit by a conventional method. Specifically, assuming that the integral value of the methylene group in the main chain of the modified PVA is b, the integral value of the oxyethylene unit is a, and the average value of the number of repeating units of the oxyethylene unit in the polyoxyalkylene unit represented by the general formula (I) is x, the modification rate is calculated as $\{a/(4\times x)\}/(b/2)\times 100$ (mol %) in consideration of the number of protons (2H for methylene groups and 4H for ethylene groups). For example, when a=1, x=1, and b=100, it is calculated as 0.5 mol %.

Further, when calculated from oxybutylene or oxypropylene units, the contents are calculated from the integrated value of the peak at 1.2 to 1.8 ppm attributed to the methylene group in the main chain of the modified PVA and the integrated value of the peak at 0.80 to 0.95 ppm attributed to the terminal methyl group of oxybutylene unit ($R_5$=H, $R_6$=$CH_2CH_3$ (or $R_5$=$CH_2CH_3$, $R_6$=H)) or oxypropylene unit ($R_5$=H, $R_6$=$CH_3$ (or $R_5$=$CH_3$, $R_6$=H)) by a conventional method. Specifically, assuming that the integral value of the methylene group in the main chain of the modified PVA is b, the integral value of the oxybutylene unit or the oxypropylene unit is c, and the average value of the number of repeating units of the oxybutylene unit or the oxypropylene unit in the polyoxyalkylene unit represented by the general formula (I) is y, the modification rate is calculated as $\{c/(3\times y)\}/(b/2)\times 100$ (mol %) in consideration of the number of protons (2H for methylene groups and 3H for methyl groups). For example, when c=1, y=1, and b=100, it is calculated as 0.67 mol %.

In addition, when the modified PVA has both the oxyethylene unit and the oxypropylene unit (or the oxybutylene unit) in the side chain, rather than the alkylene modification rate calculated from the oxyethylene unit, the measurement accuracy of the alkylene modification rate calculated based on the integrated value of the peak attributed to the terminal methyl group of the oxypropylene unit or the oxybutylene unit is higher. Therefore, when there is a difference between the two values, the alkylene modification rate calculated based on the integrated value of the peak attributed to the terminal methyl group of the oxypropylene unit or the oxybutylene unit shall be adopted.

The modified PVA needs to have a carbonyl terminal modification rate of 0.01 mol % to 0.5 mol %. When the carbonyl terminal modification rate is less than 0.01 mol %, unsaturated double bond starting points due to the carbonyl terminal reduce, and protective colloid properties decreases, and as a result, a vinyl resin having an appropriate particle diameter cannot be obtained. Therefore, the carbonyl terminal modification rate needs to be 0.01 mol % or more, preferably 0.02 mol % or more, and more preferably 0.04 mol % or more. On the other hand, when the carbonyl terminal modification rate exceeds 0.5 mol %, the amount of polymer terminal increases, so that the degree of polymerization decreases and the protective colloid property decreases, or chemical stability decreases, or the viscosity of the aqueous solution increases, or gelation occurs. Therefore, the carbonyl terminal modification rate needs to be 0.5 mol % or less, preferably 0.45 mol % or less, and more preferably 0.4 mol % or less.

The carbonyl terminal modification rate is a ratio (mol %) of the number of moles of the carbonyl unit represented by the general formula (II) to the total number of moles of the monomer units constituting the main chain of the modified PVA. The carbonyl terminal modification rate can be determined by proton NMR. Specifically, after the modified PVA is saponified to a saponification degree of 99.95 mol % or more, it is sufficiently washed with methanol to prepare a modified PVA for analysis. The prepared modified PVA for analysis is dissolved in deuterium oxide, and a few drops of a deuterium oxide solution of NaOH are added to adjust the pH to 14, and the measurement is performed at 80° C. to obtain a $^1$H-NMR spectrum. However, when measuring the formyl terminal where $R_4$ is a hydrogen atom, saponification is not necessary, and the analysis is carried out as it is. The content of each terminal is calculated from the integrated value of the peak indicating the carbonyl terminal based on the integrated value of the peak of the methylene group (1.2 to 1.8 ppm) of the main chain of the modified PVA. When $R_4$ is a methyl group, it is calculated from the integrated value of the peak at 2.15 to 2.25 ppm, and when $R_4$ has 2 or more carbon atoms, it is calculated from the integrated value of the peak at 0.95 to 1.10 ppm for the terminal methyl group. In addition, the formyl group is calculated from the integrated value of the peak at 9.2 to 9.8 ppm. Specifically, in the $^1$H-NMR spectrum for measuring each terminal, assuming that the integral value of the methylene group in the main chain of the modified PVA is b and the integral value of the carbonyl terminal is d, in consideration of the number of protons (2 for methylene group, X=3 for carbonyl terminal as the peak of methyl group is measured, but X=1 for formyl terminal), the carbonyl terminal modification rate is calculated as $(d/X)/(b/2) \times 100$ (mol %).

The viscosity-average polymerization degree of the modified PVA is preferably 300 or more, more preferably 400 or more, even more preferably 500 or more in order to increase the dispersion stability when suspension polymerization is carried out for the vinyl-based compound. Further, in order to prevent the viscosity of the aqueous solution from becoming too high to make handling difficult, the viscosity-average polymerization degree of the modified PVA is preferably 5,000 or less, more preferably 4,000 or less, even more preferably 3,000 or less, even more preferably 2,000 or less, and even more preferably 1500 or less.

The viscosity average polymerization degree is measured according to JIS K6726: 1994. That is, the modified PVA is completely saponified, purified, and then determined from the intrinsic viscosity [η] measured in water at 30° C.

In order to increase the water solubility and facilitate the handling, the saponification degree of the modified PVA is preferably 60 mol % or more, more preferably 65 mol % or more, even more preferably 70 mol % or more. In addition, in order to increase the porosity and to enhance the plasticizer absorption of the particles obtained by carrying out suspension polymerization of the vinyl-based compound, the saponification degree of the modified PVA is preferably 99.9 mol % or less, more preferably 90 mol % or less, even more preferably 80 mol % or less.

The saponification degree of the modified PVA is measured according to JIS K6726: 1994. That is, it can be determined by quantifying the residual acetic acid groups (mol %) in the sample with sodium hydroxide and subtracting it from 100.

The method for manufacturing the modified PVA according to the present invention is not particularly limited. However, in one embodiment, the method for manufacturing the modified PVA according to the present invention comprises a step of obtaining a modified vinyl ester-based polymer by copolymerizing a vinyl ester-based monomer which is typified by vinyl acetate with an unsaturated monomer having the polyoxyalkylene unit represented by the general formula (I) in the presence of an aldehyde having the carbonyl unit represented by the general formula (II), and a step of saponifying the obtained modified vinyl ester-based polymer.

Examples of the unsaturated monomer which induces a modified structure having two or more types of different repeating units represented by the general formula (I) include polyoxyalkylene alkenyl ether, polyoxyalkylene mono (meth) acrylamide, polyoxyalkylene mono (meth) allyl ether, polyoxyalkylene monovinyl ether, polyoxyalkylene mono (meth) acrylate. Specifically, examples include polyoxybutylene polyoxyethylene monoacrylamide, polyoxypropylene polyoxyethylene monoacrylamide, polyoxybutylene polyoxypropylene monoacrylamide, polyoxybutylene polyoxyethylene monomethacrylamide, polyoxypropylene polyoxyethylene monomethacrylamide, polyoxybutylene polyoxypropylene monomethacrylamide, polyoxybutylene polyoxyethylene alkenyl ether, polyoxypropylene polyoxyethylene alkenyl ether, polyoxybutylene polyoxypropylene alkenyl ether, polyoxybutylene polyoxyethylene monoallyl ether, polyoxypropylene polyoxyethylene monoallyl ether, polyoxybutylene polyoxypropylene monoallyl ether, polyoxybutylene polyoxyethylene monovinyl ether, polyoxypropylene polyoxyethylene monovinyl ether, polyoxybutylene polyoxypropylene monovinyl ether, polyoxybutylene polyoxyethylene monoacrylate, polyoxypropylene polyoxyethylene monoacrylate, polyoxybutylene polyoxypropylene mono acrylate, polyoxybutylene polyoxyethylene monomethacrylate, polyoxypropylene polyoxyethylene monomethacrylate, polyoxybutylene polyoxypropylene monomethacrylate and the like. Among them, ethers represented by the following general formula (IV) are more preferably used in terms of reactivity and performance. Specific examples of the polyoxyalkylene alkenyl ether represented by the general formula (IV) include polyoxybutylene polyoxyethylene alkenyl ether.

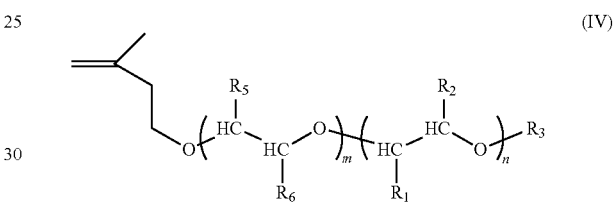

(IV)

(In the general formula (IV), $R_1$, $R_2$, $R_3$, $R_5$, $R_6$, m, and n are the same as those in the general formula (I).)

In addition to vinyl acetate, vinyl ester-based monomers include vinyl formate, vinyl propionate, vinyl valerate, vinyl caprate, vinyl laurate, vinyl stearate, vinyl benzoate, vinyl pivalate, vinyl versatate, and the like.

The method of deriving the terminal in which $R_4$ is an alkyl group having 1 to 9 carbon atoms in the general formula (II) is not particularly limited, but it is simple and efficient to use a method in which the vinyl ester-based monomer is subjected to polymerization in the presence of the corresponding aldehyde during radical polymerization, and the resulting polymer is dissolved in alcohols and then treated with an alkali such as sodium hydroxide or ammonia, or treated with an acid such as hydrochloric acid or p-toluenesulfonic acid to saponify the vinyl ester polymer. Specific examples of the aldehyde include acetaldehyde, propionaldehyde, butyraldehyde, pentylaldehyde, hexylaldehyde, heptylaldehyde, octylaldehyde, nonylaldehyde, and decanealdehyde. Among them, acetaldehyde, propionaldehyde, and butyraldehyde are particularly preferably used from the viewpoint of easy removal of residues from the reaction system and the performance.

In the modified PVA according to the present invention, it is preferable that the carbonyl unit represented by the general formula (II) have $R_4$ which is an alkyl having 1 to 9 carbon atoms, and have a formyl terminal in which $R_4$ is a hydrogen atom.

The method for deriving the formyl terminal in which $R_4$ is a hydrogen atom in the general formula (II) is not particularly limited, but a method of oxidatively cleaving the main chain of PVA with an oxidizing agent (Patent Literature: Japanese Patent Application No. 2000-86992) or a method of polymerizing in the presence of a formaldehyde, or a method of saponifying a vinyl ester-based polymer obtained by polymerization in the presence of oxygen can be mentioned. Among them, a method of polymerizing a vinyl ester-based monomer in the presence of an aldehyde during radical polymerization, in which a gas containing oxygen is introduced (typically blown), and saponifying the obtained vinyl ester-based polymer is preferable, from the viewpoint of productivity and handling of raw materials. In the present invention, the concept of "a gas containing oxygen is introduced" indicates that oxygen is additionally sent from outside the reaction system into the reaction system, and thus the oxygen due to air or the like that is initially present in the reaction system is not considered as the introduced oxygen.

When a vinyl ester-based monomer is copolymerized with an unsaturated monomer having a polyoxyalkylene unit represented by the general formula (I) in the presence of an aldehyde having a carbonyl unit of the general formula (II), although the temperature is not particularly limited, it is preferably 0° C. or more and 200° C. or less, more preferably 30° C. or more and 150° C. or less. If the temperature at which the copolymerization is carried out is lower than 0° C., a sufficient polymerization rate cannot be obtained, which is not preferable. If the temperature at which the polymerization is carried out is higher than 200° C., it is difficult to obtain the desired PVA. As a method of controlling the temperature employed in the copolymerization to be 0° C. or more and 200° C. or less, a method of controlling with an external jacket using a suitable heating medium such as water, and the like can be mentioned.

The polymerization system used for carrying out the copolymerization may be any of batch polymerization, semi-batch polymerization, continuous polymerization, and semi-continuous polymerization. As the polymerization method, any method can be adopted from publicly known methods such as a bulk polymerization method, a solution polymerization method, a suspension polymerization method, and an emulsion polymerization method. Among them, as the modifying agent to be used often have water solubility or surface active ability that affects the polymer particle diameter, a solution polymerization method or a bulk polymerization method in which polymerization is performed in the presence of an alcohol-based solvent or without using a solvent is preferably employed rather than a suspension polymerization or an emulsion polymerization, which requires control of the polymer particle diameter. As the alcohol-based solvent used in the bulk polymerization method or the solution polymerization method, methanol, ethanol, isopropanol, or the like can be used, but is not limited thereto. These solvents may be used alone or in combination of two or more.

The polymerization initiator for radical polymerization of the vinyl ester-based monomer is not particularly limited, but may be azo compounds such as azobisisobutyronitrile, azobis-2,4-dimethylvaleronitrile, azobis (4-methoxy-2,4-dimethylvaleronitrile), azobisdimethylvaleronitrile, azobismethoxyvaleronitrile; peroxide compounds such as acetyl peroxide, benzoyl peroxide, lauroyl peroxide, acetylcyclohexylsulfonyl peroxide, 2,4,4-trimethylpentyl-2-peroxyphenoxyacetate; percarbonate compounds such as diisopropylperoxydicarbonate, di-2-ethylhexylperoxydicarbonate, diethoxyethylperoxydicarbonate; perester compounds such as t-butylperoxyneodecanoate and α-cumylperoxyneodecanoate. These may be used alone or in combination of two or more.

When the copolymerization is carried out at a high temperature, coloring of PVA or the like due to decomposition of the vinyl ester-based monomer may be observed. In this case, for the purpose of preventing coloration, an antioxidant such as citric acid may be added to the polymerization system in an amount of approximately 1 ppm or more and 100 ppm or less (based on the mass of the vinyl ester-based monomer), and there would be no problem.

The saponification method for manufacturing the modified PVA according to the present invention is also not particularly limited, and it is preferable that the polymer obtained by the above-described method is used in accordance with a conventional method, doubling an alcohol as a solvent. Examples of the alcohol include methanol, ethanol, and butanol. The concentration of the polymer in the alcohol can be selected from the range of 20 to 50% by mass. As the alkali catalysts, alkali metal hydroxides and alcoholates such as sodium hydroxide, potassium hydroxide, sodium methylate, sodium ethylate, potassium methylate and the like can be used. As the acid catalyst, an aqueous solution of an inorganic acid such as hydrochloric acid and sulfuric acid, or an organic acid such as p-toluenesulfonic acid can be used. It is necessary to use these catalysts in an amount of 1 to 100 millimoles equivalent with respect to the vinyl ester-based monomer. In such a case, the saponification temperature is not particularly limited, but is usually in the range of 10 to 70° C., preferably in the range of 30 to 50° C. The reaction is usually performed for 1 to 3 hours.

The dispersion stabilizer for suspension polymerization according to the present invention may contain PVA other than the above-described modified PVA and other various additives within a range not to impair the purpose of the present invention. Examples of the additives include polymerization regulators such as aldehydes, halogenated hydrocarbons, and mercaptans; polymerization inhibitors such as phenol compounds, sulfur compounds, and N-oxide compounds; pH regulators; cross-linking agents; a preservative, an antifungal agent, an antiblocking agent, an antifoaming agent and the like. From the viewpoint of exhibiting the effects of the present invention significantly, the dispersion stabilizer for suspension polymerization of the present invention preferably comprises the modified PVA in an amount of 10% by mass or more, more preferably 30% by mass or more, and even more preferably 70% by mass or more.

The dispersion stabilizer for suspension polymerization according to the present invention can be suitably used particularly for suspension polymerization of a vinyl-based compounds. Examples of vinyl-based compounds include vinyl halides such as vinyl chloride; vinyl esters such as vinyl acetate and vinyl propionate; acrylic acid, methacrylic acid, esters and salts thereof; maleic acid, fumaric acid, esters and anhydrides thereof; styrene, acrylonitrile, vinylidene chloride, and vinyl ether, and the like. Among these, the dispersion stabilizer for suspension polymerization according to the present invention is particularly preferably used when performing suspension polymerization of vinyl chloride alone or together with a monomer capable of copolymerizing with vinyl chloride. Examples of monomers that can be copolymerized with vinyl chloride include vinyl esters such as vinyl acetate and vinyl propionate; (meth) acrylic ester such as methyl (meth) acrylate and ethyl (meth) acrylate; α-olefin such as ethylene and propylene; unsaturated dicarboxylic acids such as maleic anhydride and itaconic acid; acrylonitrile, styrene, vinylidene chloride, vinyl ether and the like.

The dispersion stabilizer for suspension polymerization according to the present invention is suitable for manufacturing a plasticized type vinyl chloride resin in terms of providing vinyl chloride resin particles having excellent plasticizer absorption. It is also excellent in monomer removal properties, particle diameter distribution, and the like, and thus can also be applied to the manufacture of a rigid vinyl chloride resin.

The dispersion stabilizer for suspension polymerization according to the present invention can be used alone or in combination with other stabilizers, for example, a cellulosic derivative, a surfactant and the like.

By using the dispersion stabilizer for suspension polymerization according to the present invention, a vinyl chloride resin having excellent physical properties such as porous resin particles, uniform particle diameter distribution, and less fish eyes can be constantly obtained. Hereinafter, the polymerization method of the vinyl-based compound will be specifically described with reference to examples but is not limited thereto.

When producing resin particles of a vinyl-based compound such as vinyl chloride resin particles, the dispersion stabilizer for suspension polymerization described above is added in an amount of 0.01% by mass to 0.3% by mass, preferably 0.04% by mass to 0.15% by mass, with respect to the vinyl-based compound monomer. The ratio of the vinyl-based compound to water can be, by mass, vinyl-based compound:water=1:0.9 to 1:3, preferably vinyl-based compound:water=1:1 to 1:1.5.

The polymerization initiator may be any of those conventionally used for the polymerization of vinyl-based compounds. Examples of such a polymerization initiator include percarbonates such as diisopropylperoxydicarbonate, di-2-ethylhexylperoxydicarbonate, and diethoxyethylperoxydicarbonate; perester compounds such as t-butylperoxyneodecanoate and α-cumylperoxyneodecanoate; peroxides such as acetylcyclohexylsulfonyl peroxide, 2,4,4-trimethylpentyl-2-peroxyphenoxyacetate; azo compounds such as azobis-2,4-dimethylvaleronitrile and azobis (4-methoxy-2,4-dimethylvaleronitrile); and further potassium persulfate, ammonium persulfate, and hydrogen peroxide, and the like. These may be used alone or in combination of two or more.

Further, it is also optional to add a polymerization regulator, a chain transfer agent, a gelling improver, an antistatic agent, a pH regulator and the like, which may be appropriately used for the polymerization of vinyl-based compounds.

In carrying out the polymerization of the vinyl-based compound, the charge ratio of each component, the polymerization temperature, and the like may be set according to the conditions conventionally used in suspension polymerization of vinyl-based compounds, and there is no reason for particular limitations.

EXAMPLES

Hereinafter, the present invention will be further described in detail with reference to examples.

Example 1

2,800 g of vinyl acetate, 39.2 g of normal butyraldehyde, 263 g of a polyoxyalkylene alkenyl ether represented by the general formula (IV) as a modifying agent in which m=5 to 9, and n=45 to 55 (Latemul PD-450 provided by Kao Corporation; Hereinafter referred to as the "monomer A".) were charged into a polymerization can. It was confirmed by the manufacturer and also confirmed by NMR that m=5 to 9 and n=45 to 55 for the monomer A. 0.2 g of azobisisobutyronitrile was charged into the polymerization can, and heated while blowing an oxygen-nitrogen mixed gas (oxygen concentration: 6 vol %, total oxygen amount with respect to vinyl acetate: 0.08 mol %) into the gas phase just above the polymerization liquid. After polymerization at 65 to 70° C. for 8 hours, the polymerization was stopped by cooling. Then, unreacted vinyl acetate was removed by a conventional method, and the obtained polymer was saponified with sodium hydroxide by a conventional method to prepare a dispersion stabilizer. The viscosity-average polymerization degree, saponification degree and modification rate of the obtained dispersion stabilizer were measured by the above-mentioned analytical methods. The viscosity-average polymerization degree was 720, and the saponification degree was 71 mol %, and the alkylene modification rate was 0.16 mol %, and the carbonyl terminal modification rate was 0.20 mol %, and the formyl terminal modification rate was 0.013 mol %.

<Suspension Polymerization of Vinyl Chloride>

In a 30 L stainless steel autoclave equipped with a stirrer, 12 kg of water at 30° C., 6.5 g of the dispersion stabilizer obtained above, and as polymerization initiators, 4.6 g of t-butylperoxyneodecanoate and 1 g of α-cumylperoxyneodecanoate were charged while stirring. After degassing the autoclave under vacuum, 5 kg of a vinyl chloride monomer was added, and polymerization was carried out at 57° C. for 4 hours.

<Evaluation of Vinyl Chloride Resin>

The average particle diameter, particle diameter distribution, plasticizer absorption amount, and bulk specific gravity of the obtained vinyl chloride resin were evaluated by the following methods.

The average particle diameter was measured in accordance with JIS Z8815: 1994, by using sieves of 60 mesh (250 μm opening), 80 mesh (180 μm opening), 100 mesh (150 μm opening), 150 mesh (106 μm opening), and 200 mesh (75 μm opening). The particle diameter (D50) at a cumulative frequency of 50% (mass basis) was determined as the average particle diameter, and the difference between the particle diameter (D80) at a cumulative frequency of 80% (mass basis) and the particle diameter (D20) at the cumulative frequency 20% (mass basis) was defined as the particle diameter distribution.

The bulk specific gravity was measured according to JIS K6720-2: 1999.

The plasticizer absorption was measured according to the following procedure. Glass fiber was filled into the bottom of an aluminum alloy container having an inner diameter of 25 mm and a depth of 85 mm, and 10 g of a vinyl chloride resin was charged. To this, 15 mL of a plasticizer (dioctyl phthalate, hereinafter referred to as DOP) was added, and the mixture was left for 30 minutes to sufficiently infiltrate the DOP into the vinyl chloride resin. Thereafter, excess DOP was centrifuged under an acceleration of 1500 G, and the mass of DOP absorbed by 10 g of the vinyl chloride resin was measured and converted to DOP parts by mass (phr) per 100 parts by mass of the vinyl chloride resin.

Example 2

2500 g of vinyl acetate, 35 g of normal butyraldehyde, and 235 g of monomer A as a modifying agent were charged into a polymerization can. After purging the system with nitrogen for 30 minutes, 0.2 g of azobisisobutyronitrile was charged into the polymerization can, and after polymerization at 65 to 70° C. for 8 hours, the polymerization was stopped by cooling. Then, the unreacted vinyl acetate was removed by a conventional method, and the obtained polymer was saponified with sodium hydroxide by a conventional method to prepare a dispersion stabilizer. The viscosity-average polymerization degree, saponification degree and modification rate of the obtained dispersion stabilizer were measured by the above-mentioned analytical methods. The viscosity-average polymerization degree was 750, and the saponification degree was 72 mol %, and the alkylene modification rate was 0.15 mol %, and the carbonyl terminal modification rate was 0.20 mol %, and the formyl terminal modification rate was 0 mol %. Further, suspension polymerization of vinyl chloride was carried out and evaluated under the same conditions as in Example 1 except that the obtained dispersion stabilizer here was used.

Example 3

1700 g of vinyl acetate, 17 g of acetaldehyde, 500 g of methanol, and 107 g of monomer A as a modifying agent were charged into a polymerization can. 0.2 g of azobisisobutyronitrile is charged into the polymerization can, and heated while blowing an oxygen-nitrogen mixed gas (oxygen concentration: 6 vol %, total oxygen amount with respect to vinyl acetate: 0.08 mol %) into the gas phase just above the polymerization liquid. After polymerization at 65 to 70° C. for 9 hours, the polymerization was stopped by cooling. Then, the unreacted vinyl acetate was removed by a conventional method, and the obtained polymer was saponified with sodium hydroxide by a conventional method to prepare a dispersion stabilizer. The viscosity-average polymerization degree, saponification degree and modification rate of the obtained dispersion stabilizer were measured by the above-mentioned analytical methods. The viscosity-average polymerization degree was 680, and the saponification degree was 71 mol %, and the alkylene modification rate was 0.13 mol %, and the carbonyl terminal modification rate was 0.10 mol %, and the formyl terminal modification rate was 0.012 mol %. Further, suspension polymerization of vinyl chloride was carried out and evaluated under the same conditions as in Example 1 except that the obtained dispersion stabilizer here was used.

Example 4

1700 g of vinyl acetate, 17 g of acetaldehyde, 500 g of methanol, and 107 g of monomer A as a modifying agent were charged into a polymerization can. After purging the system with nitrogen for 30 minutes, 0.2 g of azobisisobutyronitrile was charged into the polymerization can, and after polymerization at 65 to 70° C. for 9 hours, the polymerization was stopped by cooling. Then, the unreacted vinyl acetate was removed by a conventional method, and the obtained polymer was saponified with sodium hydroxide by a conventional method to prepare a dispersion stabilizer. The viscosity-average polymerization degree, saponification degree and modification rate of the obtained dispersion stabilizer were measured by the above-mentioned analytical methods. The viscosity-average polymerization degree was 700, and the saponification degree was 72 mol %, and the alkylene modification rate was 0.13 mol %, and the carbonyl terminal modification rate was 0.09 mol %, and the formyl terminal modification rate was 0 mol %. Further, suspension polymerization of vinyl chloride was carried out and evaluated under the same conditions as in Example 1 except that the obtained dispersion stabilizer here was used.

Example 5

The modified vinyl acetate polymer obtained in Example 4 was saponified by adjusting the amount of sodium hydroxide to prepare a dispersion stabilizer. The viscosity-average polymerization degree, saponification degree and modification rate of the obtained dispersion stabilizer were measured by the above-mentioned analytical methods. The viscosity-average polymerization degree was 700, and the saponification degree was 79 mol %, and the alkylene modification rate was 0.13 mol %, and the carbonyl terminal modification rate was 0.09 mol %, and the formyl terminal modification rate was 0 mol %. Further, suspension polymerization of vinyl chloride was carried out and evaluated under the same conditions as in Example 1 except that the obtained dispersion stabilizer here was used.

Example 6

1700 g of vinyl acetate, 17 g of acetaldehyde, 350 g of methanol, and 107 g of monomer A as a modifying agent were charged into a polymerization can. After purging the system with nitrogen for 30 minutes, 0.2 g of azobisisobutyronitrile was charged into the polymerization can, and after polymerization at 65 to 70° C. for 9 hours, the polymerization was stopped by cooling. Then, the unreacted vinyl acetate was removed by a conventional method, and the obtained polymer was saponified with sodium hydroxide by a conventional method to prepare a dispersion stabilizer. The viscosity-average polymerization degree, saponification degree and modification rate of the obtained dispersion stabilizer were measured by the above-mentioned analytical methods. The viscosity-average polymerization degree was 850, and the saponification degree was 71 mol %, and the alkylene modification rate was 0.14 mol %, and the carbonyl terminal modification rate was 0.07 mol %, and the formyl terminal modification rate was 0 mol %. Further, suspension polymerization of vinyl chloride was carried out and evaluated under the same conditions as in Example 1 except that the obtained dispersion stabilizer here was used.

Example 7

1700 g of vinyl acetate, 34 g of acetaldehyde, 350 g of methanol, and 214 g of monomer A as a modifying agent were charged into a polymerization can. After purging the system with nitrogen for 30 minutes, 0.2 g of azobisisobutyronitrile was charged into the polymerization can, and after polymerization at 65 to 70° C. for 9 hours, the polymerization was stopped by cooling. Then, the unreacted vinyl acetate was removed by a conventional method, and the obtained polymer was saponified with sodium hydroxide by a conventional method to prepare a dispersion stabilizer. The viscosity-average polymerization degree, saponification degree and modification rate of the obtained dispersion stabilizer were measured by the above-mentioned analytical methods. The viscosity-average polymerization degree was 440, and the saponification degree was 70 mol %, and the alkylene modification rate was 0.26 mol %, and the carbonyl terminal modification rate was 0.14 mol %, and the formyl terminal modification rate was 0 mol %. Further, suspension polymerization of vinyl chloride was carried out and evaluated under the same conditions as in Example 1 except that the obtained dispersion stabilizer here was used.

Example 8

2400 g of vinyl acetate, 24 g of acetaldehyde, 267 g of methanol, and 180 g of a polyoxyalkylene alkenyl ether as a modifying agent in which m=5 to 9, and n=15 to 25 (Latemul PD-420 provided by Kao Corporation; Hereinafter referred to as the "monomer A'".) were charged into a polymerization can. It was confirmed by the manufacturer and also confirmed by NMR that m=5 to 9 and n=15 to 25 for the monomer A'. After purging the system with nitrogen for 30 minutes, 0.2 g of azobisisobutyronitrile was charged into the polymerization can, and after polymerization at 65 to 70° C. for 8 hours, the polymerization was stopped by cooling. Then, the unreacted vinyl acetate was removed by a conventional method, and the obtained polymer was saponified with sodium hydroxide by a conventional method to prepare a dispersion stabilizer. The viscosity-average polymerization degree, saponification degree and modification rate of the obtained dispersion stabilizer were measured by the above-mentioned analytical methods. The viscosity-average polymerization degree was 840, and the saponification degree was 73 mol %, and the alkylene modification rate was 0.24 mol %, and the carbonyl terminal modification rate was 0.08 mol %, and the formyl terminal modification rate was 0 mol %. Further, suspension polymerization of vinyl chloride was carried out and evaluated under the same conditions as in Example 1 except that the obtained dispersion stabilizer here was used.

Example 9

2200 g of vinyl acetate, 22 g of acetaldehyde, 793 g of methanol, and 102 g of a polyethylene glycol polypropylene glycol allyl ether as a modifying agent in which m=15 to 25, and n=15 to 25 (UNILUB PKA-5013 provided by NOF Corporation; Hereinafter referred to as the "monomer A''".) were charged into a polymerization can. It was confirmed by the manufacturer and also confirmed by NMR that m=15 to 25 and n=15 to 25 for the monomer A''. After purging the system with nitrogen for 30 minutes, 0.2 g of azobisisobutyronitrile was charged into the polymerization can, and after polymerization at 65 to 70° C. for 8 hours, the polymerization was stopped by cooling. Then, the unreacted vinyl acetate was removed by a conventional method, and the obtained polymer was saponified with sodium hydroxide by a conventional method to prepare a dispersion stabilizer. The viscosity-average polymerization degree, saponification degree and modification rate of the obtained dispersion stabilizer were measured by the above-mentioned analytical methods. The viscosity-average polymerization degree was 650, and the saponification degree was 72 mol %, and the alkylene modification rate was 0.11 mol %, and the carbonyl terminal modification rate was 0.08 mol %, and the formyl terminal modification rate was 0 mol %. Further, suspension polymerization of vinyl chloride was carried out and evaluated under the same conditions as in Example 1 except that the obtained dispersion stabilizer here was used.

Comparative Example 1

1700 g of vinyl acetate, 1133 g of methanol, and 159.9 g of monomer A the same as in Example 1 as a modifying agent were charged into a polymerization can, and the system was purged with nitrogen for 30 minutes. 0.3 g of azobisisobutyronitrile was charged into the polymerization can, and after polymerization at 60° C. for 9 hours, the polymerization was stopped by cooling. Thereafter, a dispersion stabilizer was prepared in accordance with Example 1. The viscosity-average polymerization degree, saponification degree and modification rate of the obtained dispersion stabilizer were measured by the above-mentioned analytical methods. Further, suspension polymerization of vinyl chloride was carried out and evaluated under the same conditions as in Example 1 except that the obtained dispersion stabilizer here was used.

Comparative Example 2

1650 g of vinyl acetate, 1980 g of water, 1.4 g of polyvinyl alcohol as a dispersant, 21.5 g of normal butyraldehyde as a modifying agent, and 0.4 g of azobisisobutyronitrile were charged into a polymerization can, and polymerization was carried out by heating at 60° C. while blowing an oxygen-nitrogen mixed gas (oxygen concentration: 6 vol %, total oxygen amount with respect to vinyl acetate: 0.08 mol %) into the gas phase just above the polymerization liquid. When the polymerization rate reached 90%, the polymerization was stopped. Then, the unreacted vinyl acetate was removed by a conventional method, and the obtained polymer was saponified with sodium hydroxide by a conventional method to prepare a dispersion stabilizer. The viscosity-average polymerization degree, saponification degree and modification rate of the obtained dispersion stabilizer were measured by the above-mentioned analytical methods. Further, suspension polymerization of vinyl chloride was carried out and evaluated under the same conditions as in Example 1 except that the obtained dispersion stabilizer here was used.

The above polymerization rate indicates a value measured by a polymer concentration measuring method. Namely, the polymerization solution was sampled during polymerization, and the weight was measured. The polymer concentration in the polymerization solution was calculated based on the weight of the polymer obtained by distilling off the monomer and the solvent, and the amount of polymer relative to the monomer was determined to calculate the polymerization rate.

Comparative Example 3

3000 g of vinyl acetate, and 42 g of normal butyraldehyde as a modifying agent were charged into a polymerization can, and the system was purged with nitrogen for 30 minutes. 0.3 g of azobisisobutyronitrile was charged into the polymerization can, and after polymerization at 65 to 75° C. for 6 hours, the polymerization was stopped by cooling. Thereafter, a dispersion stabilizer was prepared in accordance with Example 1. The viscosity-average polymerization degree, saponification degree and modification rate of the obtained dispersion stabilizer were measured by the above-mentioned analytical methods. Further, suspension polymerization of vinyl chloride was carried out and evaluated under the same conditions as in Example 1 except that the obtained dispersion stabilizer here was used.

Comparative Example 4

1600 g of vinyl acetate, 605 g of methanol, and 0.7 g of polyoxypropylene acrylate (BLEMMER PP800 provided by NOF Corporation; hereinafter referred to as the "monomer B".) as a modifying agent were charged into a polymerization can, and the system was purged with nitrogen for 30 minutes. Further, a comonomer solution having a concentration of 10% by mass was prepared by dissolving the monomer B in methanol, and nitrogen replacement was carried out by bubbling with nitrogen gas. 2.5 g of azobisisobutyronitrile was charged into the polymerization can, and after polymerization at 60° C. for 9 hours while dropping the comonomer solution, the polymerization was stopped by cooling. Until the polymerization was stopped, the total amount of methanol added was 1066 g, and the total amount of monomer B added was 44.6 g. Thereafter, a dispersion stabilizer was prepared in accordance with Example 1. The viscosity-average polymerization degree, saponification degree and modification rate of the obtained dispersion stabilizer were measured by the above-mentioned analytical methods. Further, suspension polymerization of vinyl chloride was carried out and evaluated under the same conditions as in Example 1 except that the obtained dispersion stabilizer here was used. In addition, when the proton NMR of the obtained dispersion stabilizer was measured, the peak derived from the modifying agent observed in the polyvinyl acetate was not observed in the polyvinyl alcohol.

Comparative Example 5

1600 g of vinyl acetate, 16 g of acetaldehyde, and 0.7 g of monomer B as a modifying agent were charged into a polymerization can, and the system was purged with nitrogen for 30 minutes. Further, a comonomer solution having a concentration of 10% by mass was prepared by dissolving the monomer B in methanol, and nitrogen replacement was carried out by bubbling with nitrogen gas. 2.5 g of azobisisobutyronitrile was charged into the polymerization can, and after polymerization at 60° C. for 9 hours while dripping the comonomer solution, the polymerization was stopped by cooling. Until the polymerization was stopped, the total amount of methanol added was 1066 g, and the total amount of monomer B added was 44.6 g. Thereafter, a dispersion stabilizer was prepared in accordance with Example 1. The viscosity-average polymerization degree, saponification degree and modification rate of the obtained dispersion stabilizer were measured by the above-mentioned analytical methods. Further, suspension polymerization of vinyl chloride was carried out and evaluated under the same conditions as in Example 1 except that the obtained dispersion stabilizer here was used. In addition, when the proton NMR of the obtained dispersion stabilizer was measured, the peak derived from the modifying agent observed in the polyvinyl acetate was not observed in the polyvinyl alcohol.

The results are shown in Table 1. In Comparative Example 1, since the modifying agent deriving the carbonyl terminal was not used, the vinyl chloride resin particles became coarse, and the uniformity of the particle diameter was poor. Even when the dispersion stabilizers of Comparative Example 2 using the modifying agent deriving carbonyl terminal and the modifying agent deriving formyl terminal (oxygen introduced during polymerization) and Comparative Example 3 using only the modifying agent deriving carbonyl terminal were used, not all of the properties could be improved. Even in Comparative Examples 4 and 5 using the modifying agent similar to the polyoxyalkylene monomer modifying agent used in the Examples, not all of these properties could be improved. It is considered that the copolymerized modifying agent was cut by saponification. In contrast, when the dispersion stabilizers of Examples 1 to 9 were used, it was found that the formation of coarse particles was suppressed in the vinyl chloride resin, and particles having high uniformity in particle diameter were obtained. In addition, polymer particles having excellent plasticizer absorption, reduced blocking and adhesion of scale during polymerization, and excellent in monomer removal were obtained. Therefore, the dispersion stabilizers according to Examples 1 to 9 are extremely industrially advantageous.

TABLE 1-1

| | | Example 1 | Example 2 | Example 3 |
|---|---|---|---|---|
| Polyvinyl alcohol Used | Polyoxyalkylene monomer modifyng agent | Polyoxyalkylene alkenyl ether | | |
| | Alkylene modification rate (mol %) | 0.16 | 0.15 | 0.13 |
| | n | 45 to 55 | 45 to 55 | 45 to 55 |
| | units of n | Oxyethylene ($R_1$ = H, $R_2$ = H, $R_3$ = H) | Oxyethylene ($R_1$ = H, $R_2$ = H, $R_3$ = H) | Oxyethylene ($R_1$ = H, $R_2$ = H, $R_3$ = H) |
| | m | 5 to 9 | 5 to 9 | 5 to 9 |
| | units of m | Oxybutylene (Either of $R_5$ and $R_6$ is an ethyl group, and the other is a hydrogen atom) | Oxybutylene (Either of $R_5$ and $R_6$ is an ethyl group, and the other is a hydrogen atom) | Oxybutylene (Either of $R_5$ and $R_6$ is an ethyl group, and the other is a hydrogen atom) |
| | Modifying agent deriving carbonyl terminal | Butyraldehyde ($R_4$ = n-propyl group) | Butyraldehyde ($R_4$ = n-propyl group) | Acetaldehyde ($R_4$ = methyl group) |
| | Carbonyl terminal modification rate (mol %) (Value taking into account the formyl terminal modification rate) | 0.20 | 0.20 | 0.10 |
| | Oxygen introduction | Yes | No | Yes |
| | Formyl terminal modification rate (mol %) | 0.013 | 0 | 0.012 |
| | Viscosity-average polymerization degree | 720 | 750 | 680 |
| | Saponification degree (mol %) | 71 | 72 | 71 |
| Psysical properties of obtained vinyl chloride resin | Average particle diameter (μm) | 124 | 131 | 127 |
| | Particle diameter distribution (D80 − D20) (μm) | 46 | 53 | 48 |
| | Plasticizer absorption (phr) | 28 | 27 | 28 |
| | Bulk specific gravity (g/mL) | 0.44 | 0.45 | 0.42 |

TABLE 1-1-continued

|  |  | Example 4 | Example 5 |
|---|---|---|---|
| Polyvinyl alcohol Used | Polyoxyalkylene monomer modifyng agent | Polyoxyalkylene alkenyl ether | |
|  | Alkylene modification rate (mol %) | 0.13 | 0.13 |
|  | n | 45 to 55 | 45 to 55 |
|  | units of n | Oxyethylene ($R_1$ = H, $R_2$ = H, $R_3$ = H) | Oxyethylene ($R_1$ = H, $R_2$ = H, $R_3$ = H) |
|  | m | 5 to 9 | 5 to 9 |
|  | units of m | Oxybutylene (Either of $R_5$ and $R_6$ is an ethyl group, and the other is a hydrogen atom) | Oxybutylene (Either of $R_5$ and $R_6$ is an ethyl group, and the other is a hydrogen atom) |
|  | Modifying agent deriving carbonyl terminal | Acetaldehyde ($R_4$ = methyl group) | Acetaldehyde ($R_4$ = methyl group) |
|  | Carbonyl terminal modification rate (mol %) (Value taking into account the formyl terminal modification rate) | 0.09 | 0.09 |
|  | Oxygen introduction | No | No |
|  | Formyl terminal modification rate (mol %) | 0 | 0 |
|  | Viscosity-average polymerization degree | 700 | 700 |
|  | Saponification degree (mol %) | 72 | 79 |
| Psysical properties of obtained vinyl chloride resin | Average particle diameter (μm) | 129 | 135 |
|  | Particle diameter distribution (D80 − D20) (μm) | 48 | 55 |
|  | Plasticizer absorption (phr) | 27 | 25 |
|  | Bulk specific gravity (g/mL) | 0.43 | 0.47 |

TABLE 1-2

|  |  | Example 6 | Example 7 | Example 8 | Example 9 |
|---|---|---|---|---|---|
| Polyvinyl alcohol Used | Polyoxyalkylene monomer modifying agent | Polyoxyalkylene alkenyl ether | | | Polyethylene glycol polypropylene glycol allyl ether |
|  | Alkylene modification rate (mol %) | 0.14 | 0.26 | 0.24 | 0.11 |
|  | n | 45 to 55 | 45 to 55 | 15 to 25 | 15 to 25 |
|  | units of n | Oxyethylene ($R_1$ = H, $R_2$ = H, $R_3$ = H) | Oxyethylene ($R_1$ = H, $R_2$ = H, $R_3$ = H) | Oxyethylene ($R_1$ = H, $R_2$ = H, $R_3$ = H) | Oxypropylene (Either of $R_1$ and $R_2$ is a methyl group, and the other is a hydrogen atom; $R_3$ is a hydrogen atom) |
|  | m | 5 to 9 | 5 to 9 | 5 to 9 | 15 to 25 |
|  | units of m | Oxybutylene (Either of $R_5$ and $R_6$ is an ethyl group, and the other is a hydrogen atom) | Oxybutylene (Either of $R_5$ and $R_6$ is an ethyl group, and the other is a hydrogen atom) | Oxybutylene (Either of $R_5$ and $R_6$ is an ethyl group, and the other is a hydrogen atom) | Oxyethylene ($R_5$ = H, $R_6$ = H) |
|  | Modifying agent deriving carbonyl terminal | Acetaldehyde ($R_4$ = methyl group) | Acetaldehyde ($R_4$ = methyl group) | Acetaldehyde ($R_4$ = methyl group) | Acetaldehyde ($R_4$ = methyl group) |
|  | Carbonyl terminal modification rate (mol %) (Value taking into account the formyl terminal modification rate) | 0.07 | 0.14 | 0.08 | 0.08 |
|  | Oxygen introduction | No | No | No | No |
|  | Formyl terminal modification rate (mol %) | 0 | 0 | 0 | 0 |
|  | Viscosity-average polymerization degree | 850 | 440 | 840 | 650 |
|  | Sponification degree (mol %) | 71 | 70 | 73 | 72 |

TABLE 1-2-continued

|  |  | Example 6 | Example 7 | Example 8 | Example 9 |
|---|---|---|---|---|---|
| Psysical properties of obtained vinyl chloride resin | Average particle diameter (μm) | 130 | 125 | 134 | 136 |
| | Particle diameter distribution (D80-D20) (μm) | 55 | 44 | 54 | 54 |
| | Plasticizer absorption (phr) | 26 | 32 | 27 | 28 |
| | Bulk specific gravity (g/mL) | 0.46 | 0.40 | 0.45 | 0.42 |

TABLE 1-3

|  |  | Comparative Example 1 | Comparative Example 2 | Comparative Example 3 |
|---|---|---|---|---|
| Polyvinyl alcohol Used | Polyoxyalkylene monomer modifyng agent | Polyoxyalkylene alkenyl ether | None | None |
| | Alkylene modification rate (mol %) | 0.19 | — | — |
| | n | 45 to 55 | — | — |
| | units of n | Oxyethylene ($R_1$ = H, $R_2$ = H, $R_3$ = H) | — | — |
| | m | 5 to 9 | — | — |
| | units of m | Oxybutylene (Either of $R_5$ and $R_6$ is an ethyl group, and the other is a hydrogen atom) | — | — |
| | Modifying agent deriving carbonyl terminal | None | Butyraldehyde ($R_4$ = n-propyl group) | Butyraldehyde ($R_4$ = n-propyl group) |
| | Carbonyl terminal modification rate (mol %) (Value taking into account the formyl terminal modification rate) | — | 0.20 | 0.20 |
| | Oxygen introduction | No | Yes | No |
| | Formyl terminal modification rate | — | 0.024 | 0 |
| | Viscosity-average polymerization degree | 530 | 600 | 600 |
| | Saponification degree (mol %) | 72 | 71 | 72 |
| Psysical properties of obtained vinyl chloride resin | Average particle diameter (μm) | 143 | 148 | 205 |
| | Particle diameter distribution (D80 – D20) (μm) | 60 | 66 | 72 |
| | Plasticizer absorption (phr) | 30 | 28 | 23 |
| | Bulk specific gravity (g/mL) | 0.45 | 0.44 | 0.47 |

|  |  | Comparative Example 4 | Comparative Example 5 |
|---|---|---|---|
| Polyvinyl alcohol Used | Polyoxyalkylene monomer modifyng agent | Polyoxy propylene acrylate | Polyoxy propylene acrylate |
| | Alkylene modification rate (mol %) | 0.00 | 3.00 |
| | n | 11 to 15 | 11 to 15 |
| | units of n | Oxypropylene (Either of $R_1$ and $R_2$ is a methyl group, and the other is a hydrogen atom; $R_3$ = H) | Oxypropylene (Either of $R_1$ and $R_2$ is a methyl group, and the other is a hydrogen atom; $R_3$ = H) |
| | m | — | — |
| | units of m | — | — |
| | Modifying agent deriving carbonyl terminal | None | Acetaldehyde ($R_4$ = methyl group) |
| | Carbonyl terminal modification rate (mol %) (Value taking into account the formyl terminal modification rate) | — | 0.08 |
| | Oxygen introduction | No | No |
| | Formyl terminal modification rate | — | 0 |
| | Viscosity-average polymerization degree | 700 | 710 |
| | Saponification degree (mol %) | 72 | 71 |

TABLE 1-3-continued

| Psysical properties of obtained vinyl chloride resin | Average particle diameter (μm) | Unavailable due to blocking | 225 |
|---|---|---|---|
| | Particle diameter distribution (D80 – D20) (μm) | | 80 |
| | Plasticizer absorption (phr) | | 30 |
| | Bulk specific gravity (g/mL) | | 0.42 |

The invention claimed is:

1. A modified vinyl alcohol-based polymer, comprising a polyoxyalkylene unit represented by a general formula (I) in a side chain and a carbonyl unit represented by a general formula (II) at a main chain terminal, wherein with respect to a total mole number of monomer units constituting the main chain of the modified vinyl alcohol-based polymer, a ratio of a mole number of monomer units having the polyoxyalkylene unit represented by the general formula (I) in the side chain is 0.01 mol% to 5 mol%, a ratio of a mole number of the carbonyl unit represented by the general formula (II) is 0.01 mol% to 0.5 mol%, and the modified vinyl alcohol-based polymer comprises a monomer unit represented by a general formula (III)

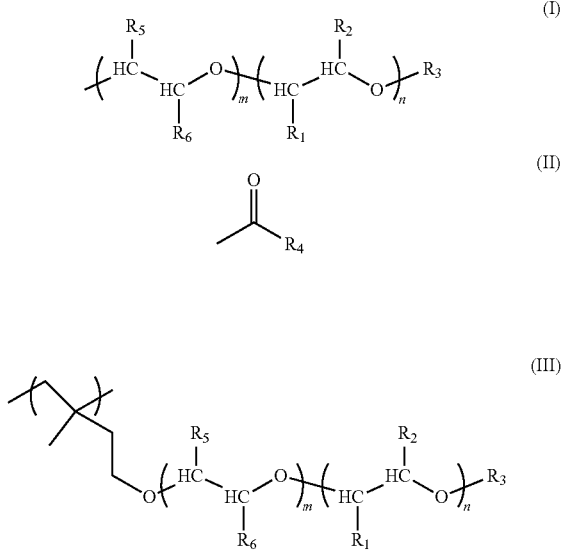

where $R_1$ and $R_2$ are each independently a methyl group, an ethyl group or a hydrogen atom, $R_3$ is a methyl group or a hydrogen atom. n represents a number of repeating units and is an integer of $1<n<70$, $R_4$ represents a hydrogen atom or an alkyl group having 1 to 9 carbon atoms, one of $R_5$ and $R_6$ is a methyl group or an ethyl group, the other of $R_5$ and $R_6$ is a hydrogen atom, and m represents a number of repeating units and is an integer of $1<m<30$.

2. The modified vinyl alcohol-based polymer according to claim 1, wherein an ether bond and/or a carbon-carbon bond is interposed between the polyoxyalkylene unit represented by the general formula (I) and the polyvinyl alcohol chain of the main chain.

3. The modified vinyl alcohol-based polymer according to claim 1, wherein the carbonyl unit represented by the general formula (II) has $R_4$ which is an alkyl having 1 to 9 carbon atoms, and $R_4$ which is a hydrogen atom.

4. The modified vinyl alcohol-based polymer according to claim 1, wherein the carbonyl unit comprises a formyl group.

5. The modified vinyl alcohol-based polymer according to claim 1, wherein a viscosity-average polymerization degree is 300 to 5,000, as measured according to JIS K6726:1994, and a saponification degree is 65 mol% to 90 mol%; as measured according to JIS K6726:1994.

6. A dispersion stabilizer for suspension polymerization, comprising the modified vinyl alcohol-based polymer according to claim 1.

7. A method for manufacturing a vinyl-based resin, comprising performing suspension polymerization using the dispersion stabilizer for suspension polymerization according to claim 6 for dispersing a vinyl-based compound monomer or a mixture of a vinyl-based compound monomer and a monomer copolymerizable with the vinyl-based compound monomer in water.

8. A method for manufacturing the modified vinyl alcohol-based polymer according to claim 1, comprising a step of obtaining a modified vinyl ester-based polymer by copolymerizing a vinyl ester-based monomer with an unsaturated monomer having the polyoxyalkylene unit represented by the general formula (I) in a presence of an aldehyde having the carbonyl unit represented by the general formula (II).

9. The method for producing a modified vinyl alcohol-based polymer according to claim 8, wherein the step of obtaining the modified vinyl ester-based polymer is performed while introducing a gas containing oxygen.

* * * * *